(No Model.)

R. HAYDEN.
CUTTING NIPPERS.

No. 452,916.  Patented May 26, 1891.

Witnesses:
J. Staib
Chas. H. Smith

Inventor:
Randolph Hayden
per Lemuel W. Serrell Atty.

UNITED STATES PATENT OFFICE.

RANDOLPH HAYDEN, OF HADDAM, CONNECTICUT.

CUTTING-NIPPERS.

SPECIFICATION forming part of Letters Patent No. 452,916, dated May 26, 1891.

Application filed April 9, 1888. Serial No. 270,049. (No model.)

*To all whom it may concern:*

Be it known that I, RANDOLPH HAYDEN, of Haddam, in the county of Middlesex and State of Connecticut, have invented a new and useful Improvement in Cutting-Nippers, of which the following is a specification.

My invention relates to cutting-nippers having removable cutting-jaws, said jaws being removable for grinding and tempering. Such jaws have heretofore been provided with tapering blocks or plates upon their rear surface adapted to slide into dovetailed recesses upon the heads of the nipper-handles. Such jaws have also been made with tapering square studs upon their rear portion, which studs were adapted to fit into tapering holes of similar shape in the heads of the nipper-handles.

My improved cutting-jaws are made with studs upon their rear portion, which studs are round and slightly tapering and are adapted to be driven into tapering holes in the heads of the nipper-handles, and the cutting-jaws have straight lower edges, which are adapted to set snugly against straight shoulders across the faces of the heads of the nipper-handles. The tapering studs, being driven tightly into the holes in the heads, serve to hold the jaws, but permit of their being removed for grinding and tempering, and the shoulder serves to prevent the jaws turning upon the tapering studs while in use.

Figure 1:
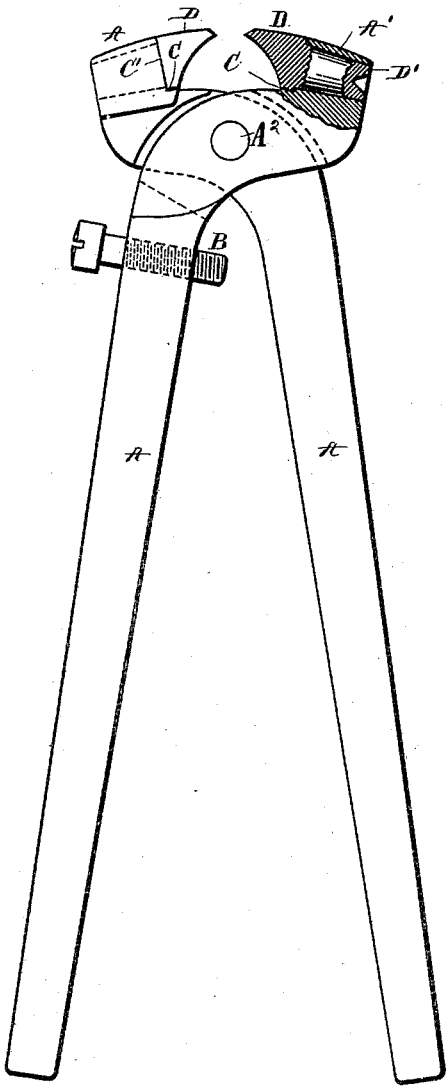
Figure 2:
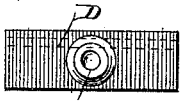

In the drawings, Figure 1 is an elevation of my improved cutting-nippers and a cross-section through one of the cutting-jaws and heads, and Fig. 2 is a rear view of one of the cutting-jaws.

The handles A are made, as usual, with heads A', and are pivoted together at A², and I employ an adjusting-screw B to regulate the point to which the cutting-jaws can be closed. The heads A' are made with shoulders at C, these shoulders being planed or dressed straight across the opposing faces of the heads A', the faces C' being also planed off true.

The removable cutting-jaws D are of hardened metal, and in cross-section their cutting-edge is preferably shaped as shown in Fig. 1, and upon the rear of each jaw there is a slightly-tapering circular stud D', and in each head A' there is a slightly-tapering circular hole adapted to receive the tapering stud D'. The back of each cutting-jaw D, or, in other words, its surface opposite its cutting-edge, is made flat and adapted to rest against the surface C', and its lower edge is straight and adapted to rest against the shoulder C. The friction or binding action between the tapering studs D' and the heads A' is sufficient to retain the cutting-jaws in place and prevent them falling away from the heads, and the shoulders at C serve to keep the cutting-jaws in their correct positions upon the heads A', with their own cutting-edges parallel, and also serve to prevent the cutters turning upon the studs while being used, and when it becomes necessary to remove the cutting-jaws to regrind or temper them they can readily be removed by a punch driven against the rear ends of the studs, and after regrinding or tempering can be easily replaced.

I claim as my invention—

The combination, with the handles A and the heads A', having shoulders at C and tapering holes, of the removable cutting-jaws D, having tapering studs D' upon the rear portions thereof and adapted to pass into the tapering holes in the heads, said jaws having straight lower edges adapted to rest against the shoulder, substantially as and for the purposes set forth.

Signed by me this 2d day of April, A. D. 1888.

RANDOLPH HAYDEN.

Witnesses:
EDWARD W. HAZEN,
A. H. HAYDEN.